Mar. 20, 1923.
A. SCOTT.
SUBSINK AND SUBSINK STRAINER.
FILED MAY 25, 1920.
1,449,300.
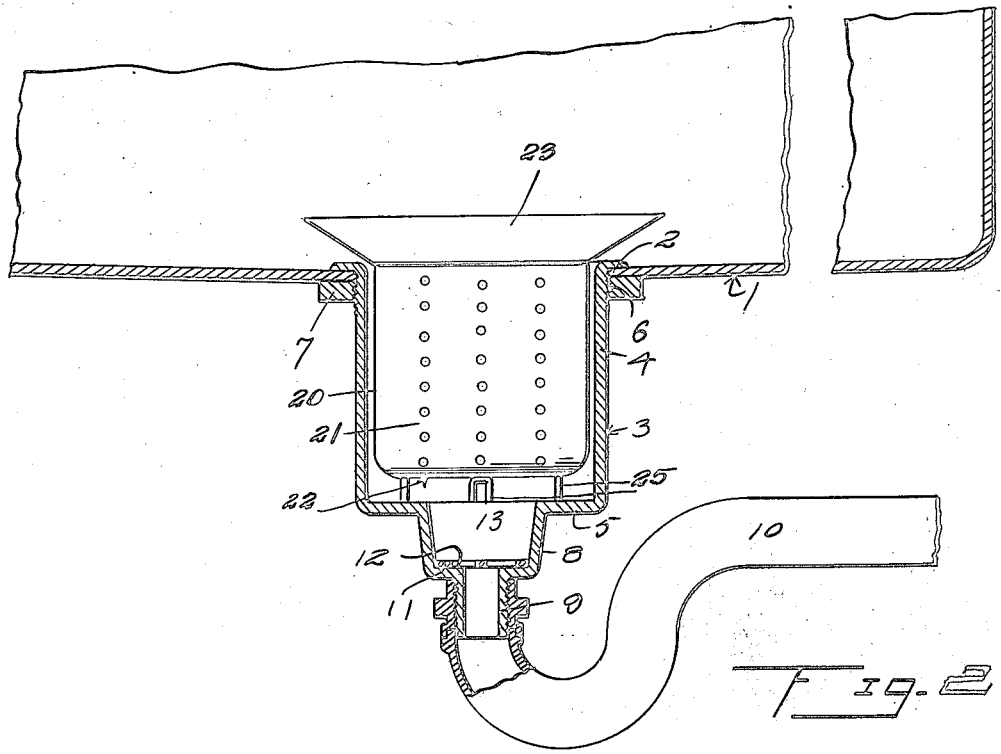
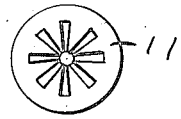
INVENTOR.
Alice Scott
BY
ATTORNEY.

Patented Mar. 20, 1923.

1,449,300

UNITED STATES PATENT OFFICE.

ALICE SCOTT, OF DES MOINES, IOWA.

SUBSINK AND SUBSINK STRAINER.

Application filed May 25, 1920. Serial No. 384,173.

*To all whom it may concern:*

Be it known that I, ALICE SCOTT, a citizen of the United States, residing at Des Moines, in the county of Polk and State of Iowa, have invented certain new and useful Improvements in Subsinks and Subsink Strainers; and I do hereby declare the following to be a full, clear, and exact description of the invention, such as will enable others skilled in the art to which it appertains to make and use the same.

This invention relates to new and useful improvements in sub-sinks and sub-sink strainers and has for its primary object the provision of means for catching and accumulating dirt and other foreign matter to prevent the same from spreading over the bottom of a sink and also to prevent the same from passing to the drain pipe or trap, thereby obviating the danger of clogging said drain pipe or trap.

Another object of this invention is the provision of means for closing the sub-sink so that the escape of water from the sink is prevented, thereby permitting the sink to be used for washing clothing and other articles.

A further object of this invention is the provision of a removable perforated receptacle adapted to fit in the sub-sink and to receive refuse and permit water to drain therefrom and which may be easily removed when desiring to empty the same of its contents.

A still further object of this invention is the provision of a sub-sink and sub-sink strainer of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a vertical sectional view, illustrating a sub-sink and sub-sink strainer applied to a sink and constructed in accordance with my invention, and Figure 2 is a plan view of the strainer.

Referring in detail to the drawings, the numeral 1 indicates as an entirety an ordinary sink having a drain opening 2 in its bottom wall and said wall inclines in the direction of said opening so that the water will readily pass out of said sink.

A sub-sink 3 consists of a cylindrical body 4 with a bottom wall 5 and said body 3 is of a considerable depth and is provided with screw threads 6 for receiving a lock nut 7 adapted to secure the open end of the body 4 within the opening 2 of the sink 1 so that refuse, dirt and other foreign matter will pass from the sink directly into the body.

A chamber 8 is formed on the bottom wall 5 and has communication with the interior of the body and is formed integrally with a screw threaded nipple 9 adapted for connection with a trap 10 of a drain pipe. A strainer 11 is positioned within the auxiliary chamber 8 on the annular shoulder 12 formed by the nipple 9 and is adapted to prevent the refuse from passing into the trap. The walls of the auxiliary chamber 8 are inclined and are adapted to be engaged by a suitable stopper 13 when desiring to prevent the escape of water from the sink 1 so that said sink can be used for washing clothing and other articles.

A refuse collecting receptacle 20 consists of a body 21 which has its lower end closed by a bottom wall 22 and has its upper end flared or enlarged to form a comparatively large receiving mouth 23. The body 21 and the bottom wall 22 is provided with a series of perforations to permit draining of water from the refuse placed within said container or receptacle and said container or receptacle is positioned within the sub-sink with the flared portion or enlarged mouth 23 projecting above said sub-sink and the bottom wall of the sink 1, so that refuse can be thrown into said receptacle and accumulated therein. A plurality of substantially U-shaped legs 25 are formed on the bottom wall 22 and adapted to space said body 21 from the bottom wall of the sub-sink.

While I have shown and described the preferred embodiment of my invention, it will be understood that minor changes in construction, combination, and arrangement of parts may be made without departing from the spirit and scope of the invention as claimed.

Having thus described my invention, what I claim is:—

A sink attachment consisting of a sub-sink to which the drain opening of the sink leads, a strainer chamber member integral with and depending from the bottom wall of the sub-sink and being open at said wall whereby a stopper may be inserted into the strainer chamber, said bottom wall of the sub-sink surrounding and extending outwardly from said chamber to form a supporting ledge for a receptacle, a strainer in said strainer chamber, and said strainer chamber member having an inwardly extending wall at its base and integral therewith to support said strainer.

In testimony whereof I affix my signature in presence of two witnesses.

ALICE SCOTT.

Witnesses:
H. STADER,
LOO LOO M. PAGE.